United States Patent [19]
Dickey

[11] 3,869,862
[45] Mar. 11, 1975

[54] FUEL CONSERVATION SYSTEM FOR MULTI-ENGINE POWERED VEHICLE

[75] Inventor: Thomas A. Dickey, Westport, Conn.

[73] Assignee: Avco Corporation, Stratford, Conn.

[22] Filed: Dec. 1, 1972

[21] Appl. No.: 311,226

[52] U.S. Cl....... 60/39.15, 60/39.18 R, 60/39.18 C, 180/66 A, 60/224, 244/17.11
[51] Int. Cl. .............................................. F02c 7/02
[58] Field of Search............ 60/39.15, 102, 39.18 R, 60/39.18 B, 39.18 C, 39.18 A, 224; 180/66 A; 244/17.11

[56] References Cited
UNITED STATES PATENTS

| | | | |
|---|---|---|---|
| 2,723,531 | 11/1955 | Wosika | 60/39.15 X |
| 2,838,913 | 6/1958 | Peterson | 60/39.15 X |
| 2,960,821 | 11/1960 | Scherl | 60/39.15 X |
| 3,180,426 | 4/1965 | Crim | 60/39.15 X |
| 3,358,441 | 12/1967 | Gist | 60/39.15 |
| 3,500,642 | 3/1970 | Foster-Pegg | 60/39.15 X |

FOREIGN PATENTS OR APPLICATIONS

| | | | |
|---|---|---|---|
| 819,489 | 9/1959 | Great Britain | 60/39.15 |
| 859,744 | 1/1961 | Great Britain | 60/39.15 |

Primary Examiner—Clarence R. Gordon
Attorney, Agent, or Firm—Charles M. Hogan; Irwin P. Garfinkle

[57] ABSTRACT

A pair of gas turbine engines drive a main rotor assembly of a helicopter through a combined output gearbox. During low power requirement conditions of the helicopter's flight regime, metered fuel flow to one of the engines is terminated and that engine driven by a connection, such as hydraulic or pneumatic, from the other engine. A pilot combustion is maintained in the combustor of the driven engine to insure that the engine may be rapidly brought to an operating condition upon demand.

10 Claims, 4 Drawing Figures

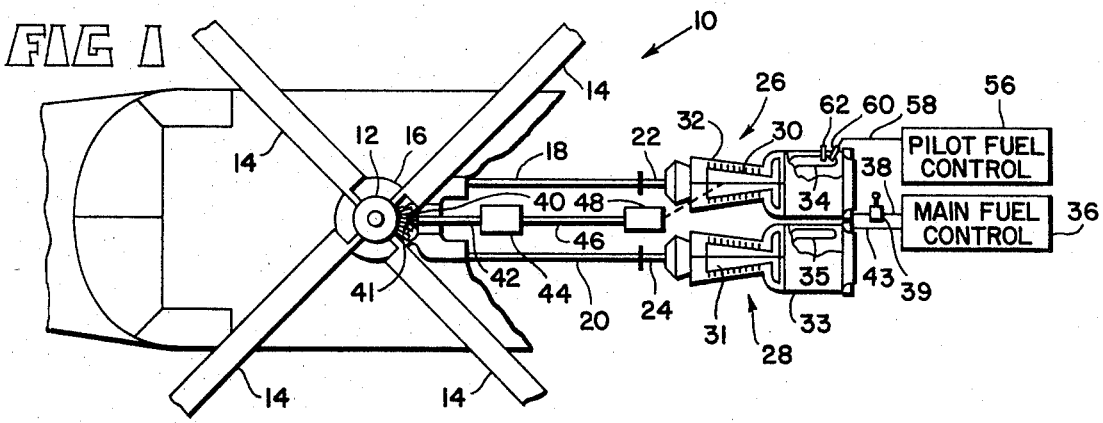

FUEL CONSERVATION SYSTEM FOR MULTI-ENGINE POWERED VEHICLE

BACKGROUND OF THE INVENTION

Multi-engined vehicles frequently have such a wide range in power output requirements that during a portion of their operating regime the engines powering the vehicle each operate below fifty percent of their rated power output. This is particularly true of helicopters operating in cool weather, since helicopters are power rated for take-off to hot day operations. It is also true of certain fixed wing aircraft that are required to loiter over an area as part of their mission.

During this condition a savings in fuel consumption of up to twenty percent can be realized by shutting one of the engines down and increasing the power output of the other to supply the total vehicle power requirements. While this objective is highly desirable, it has not been realized for several rather compelling reasons, the first of which is the uncertainty of achieving a successful start of the shut-down engine when greater power is required. The second reason is that there is usually insufficient time to complete a start and get the shut-down engine to full power in case of failure of the other engine. This second factor becomes critically important in helicopters because they have an extremely rapid sink rate during a no-power condition.

SUMMARY OF THE INVENTION

The above difficulties are overcome by terminating metered fuel flow to shut down one of at least a pair of engines powering a vehicle. The operating engine drives the shut-down engine at an idle R.P.M. substantially below its operating R.P.M. Pilot combustion is maintained in the driven engine so that it is in readiness to rapidly establish full power.

The above and other related features of the present invention will be apparent from a reading of the following description of the disclosure shown in the accompanying drawings and the novelty thereof pointed out in the appended claims.

In the drawing:

FIG. 1 is a fragmentary plan view of a helicopter and a propulsion system embodying the present invention;

FIG. 2 is an alternate embodiment of the invention shown in FIG. 1;

FIG. 3 is still another embodiment of the invention shown in FIG. 1; and

FIG. 4 is a graph illustrating total fuel flow required versus total power required for the engines shown in FIGS. 1, 2 and 3.

FIG. 1 shows a helicopter 10 having a main rotor hub 12 supporting a plurality of rotor blades 14 for rotation and resultant propulsion of the helicopter 10. Rotor hub 12 is driven from a suitable transmission 16 receiving rotatable inputs from a pair of input shafts 18 and 20 connected to power output shafts 22 and 24 of gas turbine engines 26 and 28, respectively. The transmission 16 illustrated is one common in the art wherein each engine drives the gear box through overrunning clutches so that if one of the engines is shut down or ceases to produce power its output shaft is decoupled from the transmission.

The engines 26 and 28 may be free-power turbine engines of the type shown in U.S. Pat. No. 3,088,278 in the name of Anselm Franz, entitled "Gas Turbine Engine", issued on May 7, 1963. Briefly, this type of engine comprises a gas generator in which pressurized air is ignited in a combustor to produce a hot gas stream. A portion of the hot gas stream drives a turbine which is connected to the compressor and the remainder drives a free-power turbine connected to the output shafts 22 and 24. The engines 26 and 28 have bladed compressor rotors 30, 31 journaled for rotation in housings 32, 33, respectively, to pressurize air. The pressurized air is delivered to combustors 34, 35, respectively, of the annular type where fuel is injected via a series of nozzles (not shown) to produce a combustible mixture. This mixture is ignited to produce a hot gas stream which drives a compressor turbine (not shown) and finally a power turbine (also not shown) connected to the output shafts 22, 24.

A main fuel control 36 supplies metered fuel to the nozzles of engines 26 and 28 through supply conduits 38 and 43, respectively. A single fuel control 36 for both engines is shown to simplify the description of the present invention. However, in practice separate main fuel controls may be used for the engines. As is apparent to those skilled in the art, the fuel control may incorporate various systems that meter flow to the engines in accordance with variations in selected engine operating parameters and also in such a way that during normal operating conditions the engines 26 and 28 share the load required by the rotor assembly.

During certain operating conditions the engine 26 is shut down by terminating its metered fuel flow from the main fuel control 36 by a shut-off valve 39 in conduit 38. Alternatively, the main fuel control 36 may have the capability of selectively terminating flow to the engine 26 while still permitting metered flow to be delivered to engine 28. During this condition the compressor rotor 30 of engine 26 is driven by extracting power from the other engine 28. The speed with which it rotates is at an idle R.P.M. sufficiently high to permit rapid establishment of full power but sufficiently low to minimize power requirements to drive engine 26 in a non-operating condition. As shown in FIG. 1, power is extracted from engine 28 via the rotor hub 12 which includes a ring gear 41 driving a bevel gear 40 connected with a shaft 42. An overrunning clutch 44 is interposed between shaft 42 and a second shaft 46 extending to a right angle gear box 48. Gear box 48 has a mechanical connection to compressor rotor 30.

A pilot fuel control system 56 delivers a metered flow of fuel via conduit 58 to a pilot fuel nozzle 60 for injection of a combustible mixture in a portion of the combustor 34. A suitable igniter 62 establishes combustion adjacent pilot nozzle 60 and keeps it established. If desired, the pilot fuel control system may be incorporated in the main fuel control 36.

The engine 26 may be driven by alternate methods from the engine 28. An example of one such arrangement is found in FIG. 2 wherein the compressor rotor 31' of engine 28' is mechanically connected to a hydraulic pump 64. Hydraulic lines 66 and 68 extend through a control valve system 70 to a hydraulic motor 72 mechanically connected to the rotor 30' of engine 26'. Control valve system 70 may incorporate a feature permitting control of the R.P.M. of compressor rotor 30' at a predetermined level irrespective of the R.P.M. of compressor rotor 31'.

Still another form of powering is shown in FIG. 3 wherein pressurized air from the engine 28'' is bled off through a control valve 76 via a conduit 74. This air is connected to an air turbine 78 having a rotor 80 mechanically connected to the compressor rotor 30'' of engine 26''. Control valve 76 may incorporate a system which varies flow to turbine 78 to maintain the R.P.M. of compressor rotor 30'' at a predetermined level irrespective of variations in the R.P.M. of compressor rotor 31''.

During take-off of the helicopter 10, both engines 26 and 28 are operating and driving the rotor assembly to provide sufficient lift to raise the helicopter from the ground. Once the helicopter is in air there are flight conditions, such as a cold day as pointed out above, that would enable the helicopter to operate with one of the engines shut down. This can occur for total power requirement conditions less than the available power output of one engine. When this condition is encountered fuel flow to engine 26 is terminated by shut-off valve 39 thereby extinguishing combustion in the combustor 34. At the same time clutch 44 is engaged to drive the compressor rotor 30 at an idle R.P.M., designated a cruise idle, which is substantially below the normal operating R.P.M. of the engine. The cruise idle R.P.M. is determined by several variables which work against one another to produce a resultant cruise idle R.P.M. that balances their effects. The first variable is the power required to drive the compressor rotor 30. This power increases with increasing cruise idle R.P.M. The second factor is the time to accelerate the engine to full operating power from the cruise idle R.P.M. Obviously, this time decreases with a higher level of cruise idle R.P.M. It has been found that a cruise idle R.P.M. of approximately 20 percent of the normal operating R.P.M. of the engine requires a reasonable amount of power to drive the engine but still enables the engine to be accelerated to its full power condition within a relatively short period of time.

At the same time the engine 26 is being driven at cruise idle, the pilot fuel control 56 supplies a metered amount of fuel to the pilot fuel nozzle 60. This maintains a combustible mixture in a portion of the combustor 34. The igniter 62 ignites this mixture and to insure that it stays ignited the igniter 62 may be operated continuously.

Under these conditions engine 28 is producing close to its full power where it operates most efficiently and the only power required for engine 26 is the power to drive its compressor rotor 30. In addition the fuel required for the pilot nozzle is a relatively small amount. The resultant fuel flow savings is illustrated in FIG. 4 which shows the total fuel flow required as a function of the total power required. It is apparent that with both engines operating the relationship will follow essentially a straight line in which the fuel flow required is an idle flow, $W_{fo}$ in FIG. 4, plus a directly proportional function of the total power required. With one of the engines at the cruise idle condition the total fuel flow required is substantially reduced, as shown by the curve showing the conditions with one engine at cruise idle. It can be seen that for any low total power output requirement one of the engines may be operated in the cruise idle condition to enable a substantial savings and conservation of fuel. At the same time through the driving of the shut-down engine and the establishment of the local combustible mixture in the combustor, the shut-down engine is rapidly available to produce full power when it is required.

The hydraulic and pneumatic driving systems of FIGS. 3 and 4 enable the engines to be driven directly from one another and would be particularly suitable for a vehicle in which the engines do not drive a common thrust producer, e.g., a twin-prop fixed-wing aircraft. In addition, they offer a greater flexibility in the control of the speed of the driven engine irrespective of the speed of the driving engine.

The fuel conservation system described above has been shown in connection with a twin-engine helicopter. However, it may be used for multi-engined vehicles of many different types with equal success. It is also possible to provide both engines with the capability of being alternatively driven in the cruise idle mode so that their operation during this condition can be equalized. While the preferred embodiment of the present invention has been described, it should be apparent to those skilled in the art that the engine system may be shown in different arrangements without departing from the spirit and scope of the present invention.

Having thus described the invention, what is claimed as novel and desired to be secured by Letters Patent of the United States is:

1. A fuel conservation system for a vehicle having a wide range of power requirements and normally powered simultaneously in the same direction by at least first and second gas turbine engines, each having a compressor rotor rotatable to pressurize air, a combustor receiving air from said compressor rotor and means for supplying metered fuel to said combustor, thereby enabling combustion and production of a motive gas stream, said engines being operable over relatively wide power ranges, said system comprising:
   means for selectively terminating metered flow of fuel to the combustor of said first engine;
   means connected to and deriving power from the second gas turbine engine for driving the compressor rotor of the first engine at an idle R.P.M. substantially below its normal operating R.P.M.;
   means for sustaining pilot combustion in a portion of the combustor of said first engine;
   whereby fuel consumption is significantly reduced during low vehicle power requirements and said first engine is in a state of readiness for rapid establishment of full power.

2. A system as in claim 1 wherein said driving means comprises an engageable mechanical connection between the output of said second engine to the bladed rotor of the first engine.

3. A system as in claim 1 wherein said driving means comprises a hydraulic pump connected to the second engine and a hydraulic motor hydraulically coupled to said pump and mechanically connected to the bladed rotor of the first engine.

4. A system as in claim 1 wherein said driving means comprises means for bleeding a portion of the pressurized air from the compressor rotor of said second engine and an air turbine pneumatically connected to said bleed means, said air turbine being mechanically connected to the bladed rotor of said first engine.

5. A system as in claim 1 for a helicopter having at least one main rotor driven from a transmission receiving rotational power inputs from said gas turbine engines.

6. A system as in claim 5 wherein said driving means comprises a mechanical connection between said main rotor and the bladed rotor of said first engine.

7. A system as in claim 5 wherein said driving means comprises a hydraulic pump mechanically connected to the second engine and a hydraulic motor hydraulically connected to said pump, said hydraulic motor being mechanically connected to the bladed rotor of said first engine.

8. A system as in claim 5 wherein said driving means comprises means for bleeding a portion of the pressurized air from said second engine and an air turbine pneumatically connected to said bleed means, said air turbine being mechanically connected to the bladed rotor of said first engine.

9. A system as in claim 1 wherein said means for sustaining pilot combustion comprises a fuel nozzle for injecting fuel into said combustor to maintain a combustible fuel/air mixture in a portion of said combustor and an igniter operable to ignite and maintain combustion of said fuel/air mixture.

10. A system as in claim 5 wherein said means for sustaining pilot combustion comprises a fuel nozzle injecting fuel into a portion of the combustor for said driven engine and means for maintaining combustion within said portion of the combustor.

* * * * *